(No Model.)   2 Sheets—Sheet 1.

C. RIESSNER.
COAL OIL STOVE.

No. 311,259.   Patented Jan. 27, 1885.

Witnesses:
Jas. F. Duhamel
Walter S. Dodge

Inventor
C. Riessner
by Dodge Son
Attys (No Model.) 2 Sheets—Sheet 2.

C. RIESSNER.
COAL OIL STOVE.

No. 311,259. Patented Jan. 27, 1885.

Witnesses:

Inventor:

UNITED STATES PATENT OFFICE.

CHRISTOPHER RIESSNER, OF NEW YORK, N. Y.

COAL-OIL STOVE.

SPECIFICATION forming part of Letters Patent No. 311,259, dated January 27, 1885.

Application filed January 14, 1884. (No model.)

*To all whom it may concern:*

Be it known that I, CHRISTOPHER RIESSNER, of New York, in the county of New York and State of New York, have invented certain Improvements in Coal-Oil Stoves, of which the following is a specification.

My invention relates to coal-oil stoves of that class used for cooking; and the invention consists in the peculiar construction of the same and in certain details, as hereinafter set forth.

Figure 1:
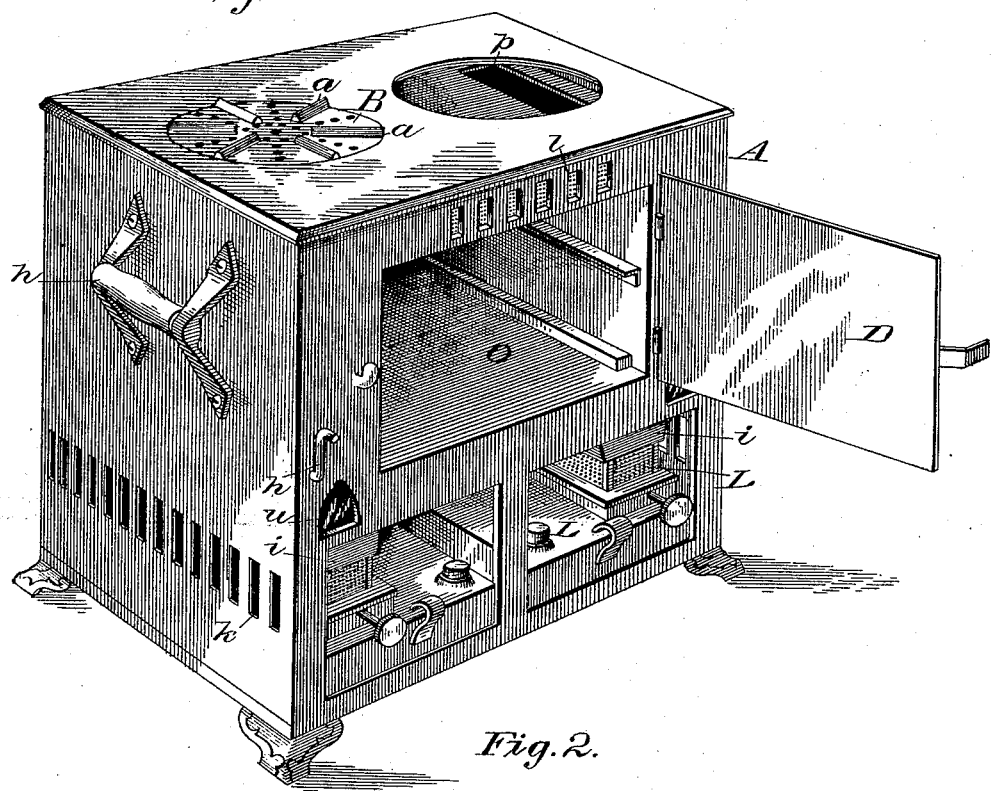
Figure 2:
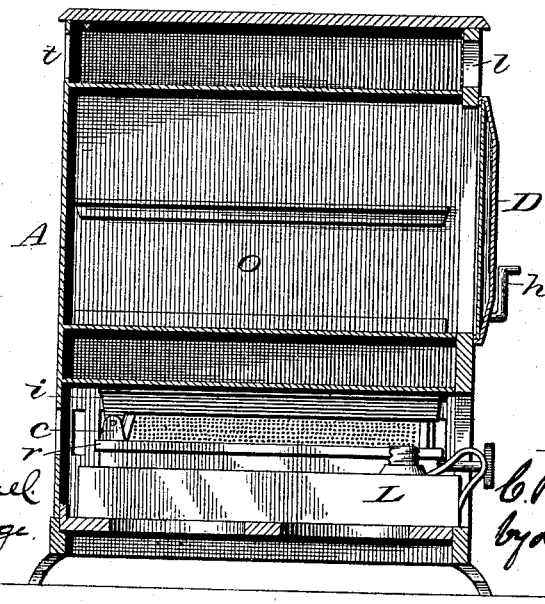
Figure 3:
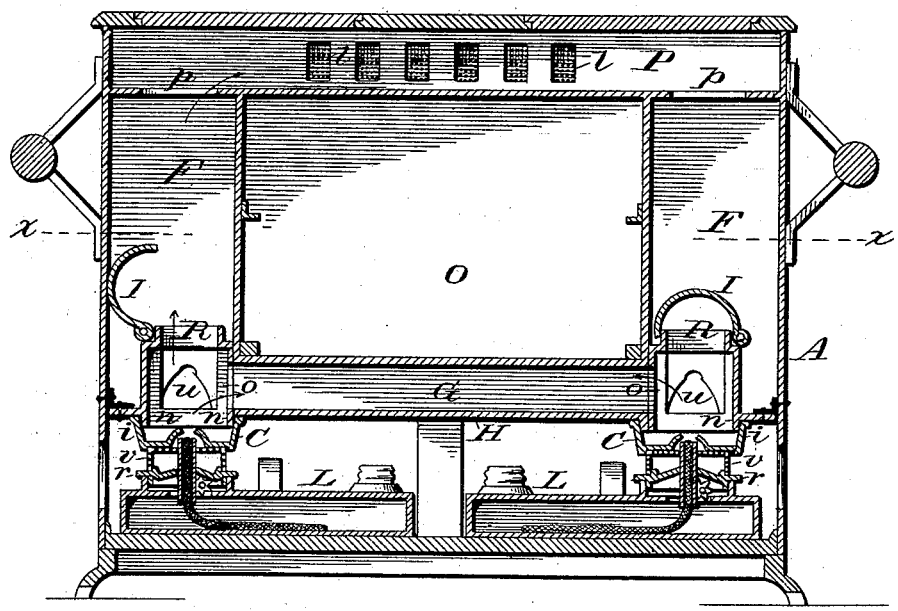
Figure 4:
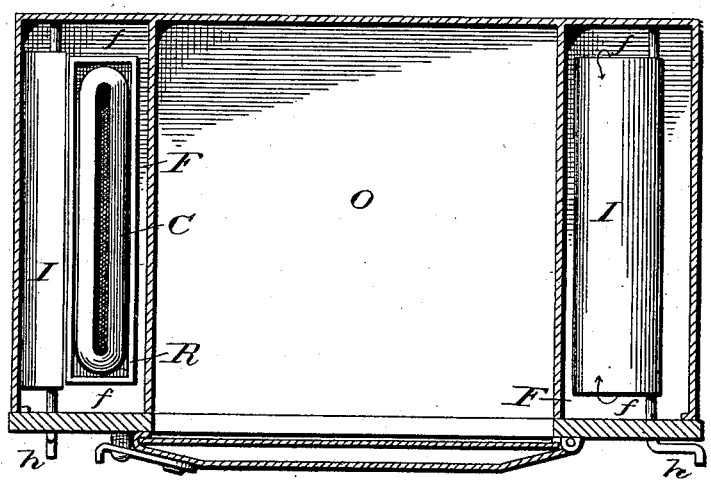

Figure 1 is a perspective view of the apparatus. Fig. 2 is a transverse vertical section; Fig. 3, a longitudinal vertical section, and Fig. 4 is a transverse or horizontal section on the line $x\,x$ of Fig. 3.

The object of this invention is to produce a coal-oil stove or range that will be better adapted to the purposes of both baking and cooking than those now in general use.

I construct my improved stove in the general form shown in Fig. 1, with a rectangular body, A, having the oven O located centrally therein, and having a flat top, like an ordinary cooking-range, with holes for the kettles in said top, so that the various cooking operations of baking and boiling can be carried on simultaneously, and to the best advantage in respect to economy of fuel.

As shown in Figs. 1, 2, and 3, an open space or chamber is formed in the lower part of the body for the reception of the lamps L, of which there are two, one at each side. A transverse partition, H, extends over this space, thus forming a flue, G, across the entire bottom of the oven, as shown in Fig. 3, and at each side of the oven is a vertical flue, F, extending from front to rear, and which, by slots $p$ at their upper ends, connect with a transverse flue, P, occupying the entire space between the top of the oven and the top plate of the stove, so that the heat flues or space extends entirely around four sides of the oven. In order, however, to regulate the heat and apply more of it to the lower portion of the oven when it is desired to use the latter, I locate at the bottom of each flue F, and directly over each lamp, a rectangular box or flue, R, which is somewhat narrower than the flue F, and which is open at top and bottom, and also has an opening, $o$, in its inner wall communicating with the flue G under the oven, as shown in Fig. 3. Over each of these I locate a curved damper or deflector, I, with its concave side downward, so that when closed, as shown in the right-hand side of Fig. 3, a space will be left at each end between it and the top of the box-flue R, through which the heat may pass out laterally. The box-flues R and the deflectors I, as shown in Fig. 4, are made somewhat shorter than the flues F, thus leaving at each end a space, $f$, for the heat to pass up into the flues F, as indicated by the arrows. By the closing of these dampers or deflectors a portion of the heat is made to pass laterally through the openings $o$ into the space or flue G underneath the oven, while its passage upward through flues F is retarded, and it is made to pass laterally along the lower portion of the side walls of the oven, thus most effectually heating the oven in all its parts. The deflectors or dampers I are each provided with a handle, $h$, as shown in Figs. 1, 2, and 4, by which they can be opened or closed at will. These box-flues R are made of cast-iron in a single piece, somewhat narrower and shorter than the flues F, in the lower end of which they are secured, as shown, and they have a vertically-projecting flange, $n$, at their lower end, as shown in Fig. 3, the object of which is to serve, in connection with raised lips or flanges on the cone C of the lamps, as a guide for the insertion of the lamps, and also to close the space around the bottom of the flue, so that no air can enter, except such as enters through the perforated box or case $v$, which surrounds the wick-tube below the cone. The top of the stove is provided with the usual holes for kettles, and griddles or covers for the same, these holes being preferably located as nearly over the flues F as may be, so that the heat ascending through said flues may operate to the best advantage upon the kettles and their contents. I also provide perforated griddles or plates B, as shown in Fig. 1, which are provided on their upper faces with a series of ribs or projections, $a$, upon which to set a kettle or other vessel when it is desired to impart thereto a more gradual heat, the heat passing through the perforations and impinging against the bottom of the vessel, and passing laterally outward through the thin spaces formed by the ribs $a$ between the vessel and the top of the griddle B. When the oven is not to be used, the deflectors or dampers I will be opened or turned back, as shown in the left-hand side of Figs. 3 and 4, in which case the heat will pass directly upward through the flues F to the kettles at the top.

In order to secure perfect combustion and a circulation of the heat, a series of openings, $k$, are formed in the walls at each end, as shown in Fig. 1, to admit air to the burners, and which openings may also extend across the back, if desired. At the top a series of openings, $l$, covered with perforated sheet metal or wire-gauze, are made, opening into the flue or space P, as shown in Figs. 1, 2, and 3, and on the back side a corresponding series of openings, $t$, are made, as shown in Fig. 2, for the heat products to pass off at. The front openings, $l$, may be provided with a slide by which they may be closed partially or entirely, as may be found desirable, and, if desired, the openings $t$ at the back may be provided with a collar, to which a pipe may be secured, and extend to a chimney-flue or out through any suitable opening, so as to convey away any disagreeable smell produced by the burning oil, though this is not usually found necessary or specially desirable.

In order to produce the desired degree of heat and avoid the necessity of refilling the lamps while in use, I make their bodies of a rectangular form and of a size corresponding to the chamber in which they are located, as shown in Figs. 1, 2, and 3, their large flat bodies holding sufficient oil for all ordinary purposes.

In order to enable the most unskilled person to place these lamps in the exact position required, directly under the box-flues R, and prevent their being misplaced by accident or carelessness, and at the same time prevent the escape of the heat into the open space below, I construct the cone C of the lamp of cast-iron, with a flange, $i$, projecting upward all around its outer edge, as shown in Figs. 1, 2, and 3, the upper edges of the side flanges, $i$, fitting snugly against the lower projecting sides of the box-flue R, as shown in Fig. 3. At its rear end the flange $i$ is made just enough lower than the sides to enable it, with the lamp, to be shoved in from the front, the sides of the flange $i$, in connection with the lower projecting end of flue R, thus serving as a guide to direct the lamp to the exact position desired, and also to prevent it from being moved sidewise or displaced after it has been inserted.

It is obvious that instead of the flange $i$ fitting outside of the walls of flue R it may be made to fit inside of the same, in which case the flange would be made of uniform height all around, and the front lower edge of the box-flue R be cut away sufficiently to permit the cone-box to be shoved into place, the one being merely the reverse of the other arrangement and operating just the same. It will be seen that the flange or box $i$ which surrounds the cone C makes a close connection with the box-flue R above, and thus prevents the escape of the heat laterally into the open space below the flue G. The top $r$ of the lamp, to which the wick-tube is connected, I also make of cast-iron, and, as shown in Fig. 2, it is provided at one end with a couple of ears or lugs, $c$, to which the cone-box $i$, also provided with similar ears, is hinged, so that the cone-box can be turned up out of the way when necessary to get at the wick for any purpose. This arrangement also prevents the cone-box from being detached and turned end for end when replaced, as it would otherwise be liable to be by the thoughtlessness of servants, and in which case the lamp could not be properly replaced.

It will be observed that the door D of the oven is made double, which serves the two-fold purpose of keeping it in shape, so it will shut true and even all around, and also prevents the radiation of heat from the oven. If desired, the back of the oven, and also the outer walls, may in like manner be made double, with an air-space between, though in ordinary practice I do not find this necessary.

These stoves or ranges I propose to make of various sizes and with single or double ovens, in which latter case another flue F will be formed centrally between the two ovens, and either one or two additional lamps be used, as circumstances may require, the additional lamp or lamps of course being located under this central flue, the same as in the case of those shown. By this construction I am enabled to provide a coal-oil stove or range that will answer all the requirements of families, and in which all the operations of cooking and baking can be carried on simultaneously, thus lessening the time required, and reducing the time that the stove must be kept heated, and which in hot weather is an important consideration.

It is obvious that, if desired, a coil of pipe or a water-back may be arranged within the heat-flues and be connected with a water-boiler, the same as with the ordinary range; but this will be seldom required.

I am aware that a coal-oil stove has been patented in which the cone appears to be secured to the stove instead of to the lamp or burner; and I do not claim any such device or arrangement; but What I do claim is—

1. The combination, in a coal-oil stove, of an oven, O, having a vertical heat-flue, F, at each side, and a curved hinged damper or deflector, I, for each flue, with a space at its ends within the flue, whereby when said deflector is closed the heat from the lamp is caused to first pass laterally in opposite directions along the sides of the oven at its lower portion, and pass thence from under the ends of the deflector up into the flue above, substantially as described.

2. The lamp L, having a cone, C, provided with the vertically-projecting lips $i$, in combination with the box-flue R, provided with the downwardly-projecting lips or flanges n, said parts being constructed and arranged to operate as described, whereby the lamp, when inserted in the stove, is guided to its position and its displacement is prevented, as set forth.

3. The combination, in a coal-oil stove, of the centrally-located oven O, surrounded by the flues F, F, G, and P, and the box-flues R, provided with openings o at their inner sides and at top and bottom, and having the curved deflector I hinged thereto, as shown, all being arranged to operate substantially as shown and described.

CHRISTOPHER RIESSNER.

Witnesses:
CHAS. C. TALCOTT,
W. S. HOLBROOK.